(12) United States Patent
Wang et al.

(10) Patent No.: US 11,716,210 B2
(45) Date of Patent: Aug. 1, 2023

(54) SIGNAL INTEGRATION CIRCUIT AND ELECTRONIC DEVICE

(71) Applicant: GETAC TECHNOLOGY CORPORATION, New Taipei (TW)

(72) Inventors: Min-Yu Wang, Taipei (TW); Kuan-Yu Chen, Taipei (TW)

(73) Assignee: GETAC TECHNOLOGY CORPORATION, New Taipei (TW)

( * ) Notice: Subject to any disclaimer, the term of this patent is extended or adjusted under 35 U.S.C. 154(b) by 2 days.

(21) Appl. No.: 17/588,171

(22) Filed: Jan. 28, 2022

(65) Prior Publication Data

US 2022/0360285 A1 Nov. 10, 2022

Related U.S. Application Data

(60) Provisional application No. 63/184,100, filed on May 4, 2021.

(51) Int. Cl.
| | |
|---|---|
| H04L 9/40 | (2022.01) |
| H04B 7/06 | (2006.01) |
| H03F 3/189 | (2006.01) |
| H04B 1/12 | (2006.01) |
| H04B 1/40 | (2015.01) |

(52) U.S. Cl.
CPC ............... *H04L 9/40* (2022.05); *H03F 3/189* (2013.01); *H04B 1/12* (2013.01); *H04B 1/40* (2013.01); *H04B 7/0613* (2013.01); *H03F 2200/294* (2013.01); *H03F 2200/451* (2013.01)

(58) Field of Classification Search
CPC ..... H04L 9/40; H03F 3/189; H03F 2200/294; H03F 2200/451; H04B 1/12; H04B 1/40; H04B 7/0613
See application file for complete search history.

(56) References Cited

U.S. PATENT DOCUMENTS

| | | | |
|---|---|---|---|
| 8,483,749 B2 * | 7/2013 | Jang ..................... | H04B 1/0057 455/334 |
| 2017/0117864 A1 * | 4/2017 | Shimada ................ | H03G 9/025 |
| 2017/0117865 A1 * | 4/2017 | Shimada ................ | H03G 9/025 |

\* cited by examiner

*Primary Examiner* — Junpeng Chen

(57) ABSTRACT

An electronic device includes a communication module, an external module and a signal integration circuit. The signal integration circuit includes a first input port, a second input port, a third input port and an output port. The first input port is for inputting an input signal. The second input port is for selectively inputting a first L1 band signal. The third input port is for selectively inputting a second L1 band signal. The output port selectively outputs a first output signal or a second output signal. When the third input port is coupled to an external module, the third input port is for inputting the second L1 band signal, and the output port outputs the second output signal. When the third input port is not coupled to the external module, the second input port is for inputting the first L1 band signal, and the output port outputs the first output signal.

12 Claims, 2 Drawing Sheets

SIGNAL INTEGRATION CIRCUIT AND ELECTRONIC DEVICE

The application claims priority to U.S. Provisional Application No. 63/184,100, filed on May 4, 2021, the disclosure of which is hereby incorporated by reference herein in its entirety.

BACKGROUND OF THE INVENTION

Field of the Invention

The present invention relates to signal integration and, more particularly, to a signal integration circuit and an electronic device capable of integrating multiple received input signals into one output signal.

Description of the Prior Art

With the thriving development of wireless broadband networks and mobile communication technologies, electronic products equipped with numerous different communication functions and external antenna modules are extensively applied, such that the number of antenna elements is also ever-increasing along with the evolving communication technologies. However, this severely affects communication quality of the electronic products.

SUMMARY OF THE INVENTION

In view of the above, a signal integration circuit suitable for a communication module and an external module is provided according to an embodiment of the present invention. The signal integration circuit includes a first input port, a second input port, a third input port and an output port. The first input port is coupled to an input signal, wherein the input signal includes a high band signal and a low band signal. The second input port is coupled to a first L1 band signal, and is for selectively inputting the first L1 band signal, wherein the first L1 band signal has an overlapping band overlapping with a specific frequency in the low band signal. The third input port is selectively coupled to the external module. The external module outputs a second L1 band signal, and a band of the second L1 band signal substantially overlaps with a band of the first L1 band signal. The output port is coupled to the communication module, and selectively outputs a first output signal or a second output signal. The first output signal includes the high band signal, the low band signal from which the overlapping band is filtered out, and the first L1 band signal. The second output signal includes the high band signal, the low band signal from which the overlapping band is filtered out, and the second L1 band signal. Moreover, when the third input port is coupled to the external module, the third input port is for inputting the second L1 band signal, and the output port outputs the second output signal. When the third input port is not coupled to the external module, the second input port is for inputting the first L1 band signal, and the output port outputs the first output signal.

An electronic device provided according to an embodiment of the present invention includes a communication module, an external module and a signal integration circuit. The signal integration circuit includes a first input port, a second input port, a third input port and an output port. The first input port is coupled to an input signal, wherein the input signal includes a high band signal and a low band signal. The second input port is coupled to a first L1 band signal, and is for selectively inputting the first L1 band signal, wherein the first L1 band signal has an overlapping band overlapping with a specific frequency in the low band signal. The third input port is selectively coupled to the external module. The external module outputs a second L1 band signal, and a band of the second L1 band signal substantially overlaps with a band of the first L1 band signal. The output port is coupled to the communication module, and selectively outputs a first output signal or a second output signal. The first output signal includes the high band signal, the low band signal from which the overlapping band is filtered out, and the first L1 band signal. The second output signal includes the high band signal, the low band signal from which the overlapping band is filtered out, and the second L1 band signal. Moreover, when the third input port is coupled to the external module, the third input port is for inputting the second L1 band signal, and the output port outputs the second output signal. When the third input port is not coupled to the external module, the second input port is for inputting the first L1 band signal, and the output port outputs the first output signal.

A signal integration circuit suitable for a communication module and an external module is further provided according to an embodiment of the present invention. The signal integration circuit includes a first input port, a third input port and an output port. The first input port is coupled to an input signal, wherein the input signal includes a high band signal, a low band signal and a first L1 band signal, and the first L1 band signal has an overlapping band overlapping with a specific frequency in the low band signal. The third input port is selectively coupled to the external module. The external module outputs a second L1 band signal, and a band of the second L1 band signal substantially overlaps with a band of the first L1 band signal. The output port is coupled to the communication module, and selectively outputs a first output signal or a second output signal. The first output signal includes the high band signal, the low band signal from which the overlapping band is filtered out, and the first L1 band signal. The second output signal includes the high band signal, the low band signal from which the overlapping band is filtered out, and the second L1 band signal. Moreover, when the third input port is coupled to the external module, the third input port is for inputting the second L1 band signal, and the output port outputs the second output signal. When the third input port is not coupled to the external module, the output port outputs the first output signal.

An electronic device further provided according to an embodiment of the present invention includes a communication module, an external module and a signal integration circuit. The signal integration circuit includes a first input port, a third input port and an output port. The first input port is coupled to an input signal, wherein the input signal includes a high band signal, a low band signal and a first L1 band signal, and the first L1 band signal has an overlapping band overlapping with a specific frequency in the low band signal. The third input port is selectively coupled to the external module. The external module outputs a second L1 band signal, and a band of the second L1 band signal substantially overlaps with a band of the first L1 band signal. The output port is coupled to the communication module, and selectively outputs a first output signal or a second output signal. The first output signal includes the high band signal, the low band signal from which the overlapping band is filtered out, and the first L1 band signal. The second output signal includes the high band signal, the low band signal from which the overlapping band is filtered out, and the second L1 band signal. Moreover, when the third input port is coupled to the external module, the third input port is for inputting the second L1 band signal, and the output port outputs the second output signal. When the third input port is not coupled to the external module, the output port outputs the first output signal.

In the signal integration circuit and the electronic device provided according to the embodiments of the present invention, multiple different input signals (including the input signal, the first L1 band signal and the second L1 band signal) are received at the same time by the signal integration circuit, and the band overlapping with the L1 band is filtered out from the input signal. These signals are then integrated into one output signal, and outputted to one input port of the communication module. Accordingly, the number of input ports required for the communication module is reduced without affecting the download speed of input signals or the reception sensitivity with respect to the L1 band.

The description above is only a summary of the technical solutions of the present invention. To more clearly understand the technical means of the present invention so as to enable implementation based on the description of the application, and to better understand the above and other objectives, features and advantages of the present invention, preferred embodiments are described in detail with the accompanying drawings below.

DETAILED DESCRIPTION OF THE EMBODIMENTS

Figure 1:
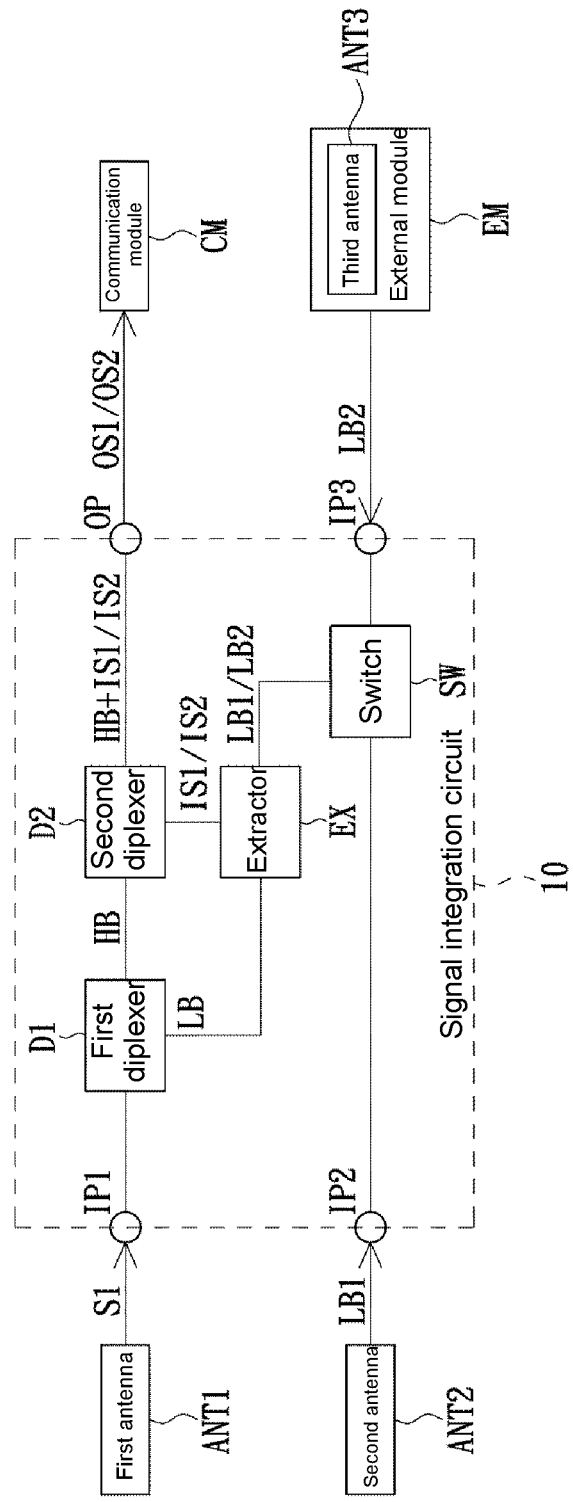
FIG. 1 is a block schematic diagram of an electronic device according to an embodiment of the present invention.

Referring to FIG. 1, FIG. 1 shows a block schematic diagram of an electronic device according to an embodiment of the present invention. An electronic device 1 includes a communication module CM, an external module EM and a signal integration circuit 10. The signal integration circuit 10 includes a first input port IP1, a second input port IP2, a third input port IP3 and an output port OP. The first input port IP1 is for inputting (receiving) an input signal S1, wherein the input signal S1 includes a high band (e.g., 3.3 GHz to 5.9 GHz) signal HB and a low band (e.g., 617 MHz to 2.69 GHz) signal LB. The second input port IP2 is for inputting a first L1 band (e.g., 1.56 GHz to 1.61 GHz) signal LB1, and the third input port IP3 is for inputting a second L1 band (e.g., 1.56 GHz to 1.61 GHz) signal LB2, wherein the band of the second L1 band signal LB2 preferably overlaps with the band of the first L1 band signal LB1. Moreover, the first L1 band signal LB1 has an overlapping band (i.e., 1.56 GHz to 1.61 GHz) overlapping with a specific frequency in the low band signal LB.

The output port OP is for outputting (transmitting) a first output signal OS1 or a second output signal OS2 to an input port of the communication module CM. The first output signal OS1 includes the high band signal HB, a low band signal LB from which the overlapping band is filtered out (i.e., a low band signal LB excluding the overlapping band), and the first L1 band signal LB1. The second output signal OS2 includes the high band signal HB, the low band signal LB from which the overlapping band is filtered out, and the second L1 band signal LB2. Thus, the first L1 band signal LB1 or the second L1 band signal LB2 is prevented from interference of the low band signal LB, hence from affecting reception sensitivity of GPS with respect to the L1 band. Moreover, the communication module CM needs only one input port in order to simultaneously process multi-band signals included in the first output signal OS1 or the second output signal OS2 received, so that the number of input ports required for the communication module CM can be reduced without affecting the download speed of the input signal S1. For example, when the third input port IP3 is coupled to the external module EM, the third input port IP3 receives the second L1 band signal LB2. Thus, the signal integration circuit 10 separates or merges signals according to the input signal S1 and the second L1 band signal LB2 received, thereby outputting the second output signal OS2 from the output port OP. Conversely, when the third input port IP3 is not coupled to the external module EM, the third input port IP3 does not receive the second L1 band signal LB2. Thus, the signal integration circuit 10 separates or merges signals according to the input signal S1 and the first L1 band signal LB1 received, thereby outputting the first output signal OS1 from the output port OP.

The external module EM is coupled to the third input port IP3, and the external module EM includes a third antenna ANT3. The third antenna ANT3 is preferably a GPS antenna that receives the second L1 band signal LB2, and may be, for example, an active high gain antenna that receives 1.56 GHz to 1.61 GHz.

The communication module CM includes an input port, a radio-frequency (RF) signal processing unit and a baseband signal processing unit. The input port of the communication module CM is coupled to the output port OP, and is for receiving the first output signal OS1 or the second output signal OS2. The communication module CM functions as a module that receives or transmits wireless wide area network (WLAN) signals (e.g., 4G and 5G) and GPS signals, and such functions are completed by, for example, the RF signal processing unit and the baseband signal processing unit.

Moreover, the electronic device 1 further includes a first antenna ANT1 and a second antenna ANT2. The first antenna ANT1 is coupled to the first input port IP1, and is preferably a 5G antenna that receives the high band signal HB and the low band signal LB. The second antenna ANT2 is coupled to the second input port IP2, and is preferably a GPS antenna receiving the first L1 band signal LB1, for example, an active antenna (e.g., a patch antenna having a built-in low-noise amplifier (LNA)) that receives 1.56 GHz to 1.61 GHz. It should be noted that, the first L1 band signal LB1 has an overlapping band (i.e., 1.56 GHz to 1.61 GHz) overlapping with a specific frequency in the low band signal LB. In one embodiment of the present invention, the reception sensitivity of the third antenna ANT3 is preferably better than the reception sensitivity of the second antenna ANT2, so that the signal strength of the second L1 band signal LB2 is greater than the signal strength of the first L1 band signal LB1.

In one embodiment of the present invention, the signal integration circuit 10 further includes a first diplexer D1, a second diplexer D2, a switch SW and an extractor EX. The first diplexer D1 includes an input terminal, a first output terminal and a second output terminal, wherein the input terminal is coupled to the first input port IP1. The function of the first diplexer D1 is to separate the input signal S1 into the high band signal HB and the low band signal LB, that is, separately outputting the high band signal HB and low band signal LB, such that the low band signal LB is outputted from the first output terminal and the high band signal HB is outputted from the second output terminal.

The switch SW includes a first input terminal, a second input terminal and an output terminal, wherein the first input terminal is coupled to the second input port IP2, the second input terminal is coupled to the third input port IP3, and the output terminal is coupled to the extractor EX. The function of the switch SW is to selectively couple the output terminal to the first input terminal or the second input terminal, so as to selectively output the first L1 band signal LB1 or the second L1 band signal LB2. For example, when the third input port IP3 is coupled to the external module EM, the switch SW couples the output terminal to the second input terminal, so as to output the second L1 band signal LB2 having a greater signal strength to the extractor EX, thereby enhancing GPS reception sensitivity. Conversely, when the third input port IP3 is not coupled to the external module EM, the switch SW couples the output terminal to the first input terminal so as to output the first L1 band signal LB1 to the extractor EX.

The extractor EX includes a first input terminal, a second input terminal and an output terminal, wherein the first input terminal is coupled to the first output terminal of the first diplexer D1, the second input terminal is coupled to the output terminal of the switch SW, and the output terminal is coupled to the second diplexer D2. The function of the extractor EX is to filter out the overlapping band from the low band signal LB, that is, filtering out the signal contained in the overlapping band to minimize the energy of such signal, so that the signal quality of the first L1 band signal LB1 or the second L1 band signal LB2 is not affected by interference, thereby preventing degradation of GPS reception sensitivity. Next, the low band signal LB from which the overlapping band is filtered out and the first L1 band signal LB1 are merged into a first integrated signal IS1 that is outputted from the output terminal, or the low band signal LB from which the overlapping band is filtered out and the second L1 band signal LB2 are merged into a second integrated signal IS2 that is outputted from the output terminal.

The second diplexer D2 includes a first input terminal, a second input terminal and an output terminal, wherein the first input terminal is coupled to the second output terminal of the first diplexer D1, the second input terminal is coupled to the output terminal of the extractor EX, and the output terminal is coupled to the output port OP. The function of the second diplexer D2 is to merge the high band signal HB and the first integrated signal IS1 into the first output signal OS1 that is outputted from the output terminal, or to merge the high band signal HB and the second integrated signal IS2 into the second output signal OS2 that is outputted from the output terminal.

Figure 2:
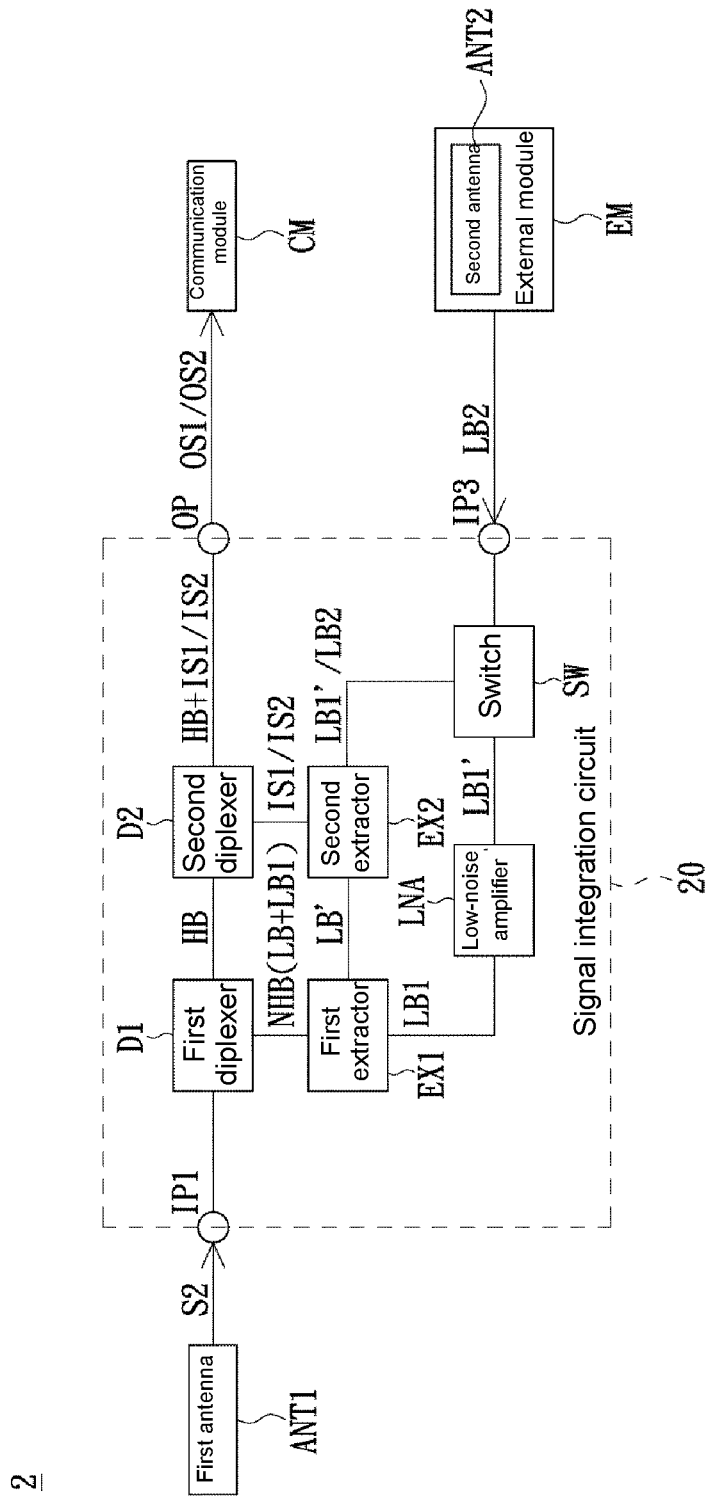
FIG. 2 is a block schematic diagram of an electronic device according to another embodiment of the present invention.

Referring to FIG. 2, FIG. 2 shows a block schematic diagram of an electronic device according to another embodiment of the present invention. An electronic device 2 differs from the electronic device 1 in respect of the number of antennas, the number of input ports of a signal integration circuit 20, and the internal circuit structure of the signal integration circuit 20. More specifically, the electronic device 2 uses two antennas, wherein the first antenna ANT1 is a two-in-one antenna integrating the 5G band and the L1 band of GPS, and so the signal integration circuit 20 needs only two input ports. Apart from the above, details of parts that are identical in the electronic device 2 and the electronic device 1 are omitted herein.

The electronic device 2 includes a communication module CM, an external module EM and a signal integration circuit 20. The signal integration circuit 20 includes a first input port IP1, a third input port IP3 and an output port OP. The first input port IP1 is for inputting an input signal S2, wherein the input signal S2 includes a high band signal HB, a low band signal LB and a first L1 band signal LB1. Moreover, the first L1 band signal LB1 has an overlapping band overlapping with a specific frequency in the low band signal LB. The third input port IP3 is for inputting the second L1 band signal LB2, wherein the band of the second L1 band signal LB2 preferably overlaps with the band of the first L1 band signal LB1.

The output port OP is for outputting a first output signal OS1 or a second output signal OS2 to an input port of the communication module CM. The first output signal OS1 includes the high band signal HB, the low band signal LB from which the overlapping band is filtered out, and the first L1 band signal LB1. The second output signal OS2 includes the high band signal HB, the low band signal LB from which the overlapping band is filtered out, and the second L1 band signal LB2. Thus, the first L1 band signal LB1 or the second L1 band signal LB2 is prevented from interference of the low band signal LB, hence from affecting reception sensitivity of GPS with respect to the L1 band. Moreover, the communication module CM needs only one input port in order to simultaneously process multi-band signals included in the first output signal OS1 or the second output signal OS2 received, so that the number of input ports required for the communication module CM can be reduced without affecting the download speed of the input signal S2. For example, when the third input port IP3 is coupled to the external module EM, the third input port IP3 receives the second L1 band signal LB2. Thus, the signal integration circuit 20 separates or merges signals according to the input signal S2 and the second L1 band signal LB2 received, thereby outputting the second output signal OS2 from the output port OP. Conversely, when the third input port IP3 is not coupled to the external module EM, the third input port IP3 does not receive the second L1 band signal LB2. Thus, the signal integration circuit 20 separates or merges signals according to the input signal S2 received, thereby outputting the first output signal OS1 from the output port OP.

The external module EM is coupled to the third input port IP3, and the external module EM includes a second antenna ANT2. The second antenna ANT2 is preferably a GPS antenna that receives the second L1 band signal LB2, and may be, for example, an active high gain antenna that receives 1.56 GHz to 1.61 GHz.

Moreover, the electronic device 2 further includes a first antenna ANT1. The first antenna ANT1 is coupled to the first input port IP1, and is preferably an antenna capable of receiving the high band signal HB, the low band signal LB and the first L1 band signal LB1; that is, 5G and GPS antennas are integrated into the first antenna ANT1, wherein the GPS antenna is preferably a passive antenna (e.g., a PIFA antenna). In one embodiment of the present invention, the reception sensitivity of the second antenna ANT2 with respect to the L1 band (e.g., 1.56 GHz to 1.61 GHz) is preferably better than the reception sensitivity of the first antenna ANT1 with respect to the L1 band, so that the signal strength of the second L1 band signal LB2 is greater than the signal strength of the first L1 band signal LB1.

In one embodiment of the present invention, the signal integration circuit 20 further includes a first diplexer D1, a second diplexer D2, a first extractor EX1, a second extractor EX2, a low-noise amplifier LNA and a switch SW. The first diplexer D1 includes an input terminal, a first output terminal and a second output terminal, wherein the input terminal is coupled to the first input port IP1. The function of the first diplexer D1 is to separate the input signal S2 into the high band signal HB and a non-high band signal NHB (i.e., the low band signal LB and the first L1 band signal LB1), that is, separately outputting the high band signal HB and the non-high band signal NHB, such that the non-high band signal NHB is outputted from the first output terminal and the high band signal HB is outputted from the second output terminal.

The first extractor EX1 includes an input terminal, a first output terminal and a second output terminal, wherein the input terminal is coupled to the first output terminal of the first diplexer D1. The function of the first extractor EX1 is to separate the non-high band signal NHB into the low band signal LB and the first L1 band signal LB1 (that is, separately outputting the low band signal LB and the first L1 band signal LB1), and at the same time filtering out a signal contained in the overlapping band (i.e., 1.56 GHz to 1.61 GHz) from the low band signal LB, so that the energy of such signal is minimized or even approaches zero, and to output the first L1 band signal LB1 from the first output terminal and output a low band signal LB' from which the overlapping band is filtered out from the second output terminal.

The low-noise amplifier LNA includes an input terminal and an output terminal, wherein the input terminal is coupled to the first output terminal of the first extractor EX1. The function of the low-noise amplifier LNA is to amplify the first L1 band signal LB1 and output an amplified first L1 band signal LB1' from the output terminal, so as to transmit the amplified first L1 band signal LB1' to the switch SW.

The switch SW includes a first input terminal, a second input terminal and an output terminal, wherein the first input terminal is coupled to the output terminal of the low-noise amplifier LNA, the second input terminal is coupled to the third input port IP3, and the output terminal is coupled to the second extractor EX2. The function of the switch SW is to selectively couple the output terminal to the first input terminal or the second input terminal, so as to selectively output the amplified first L1 band signal LB1' or the second L1 band signal LB2. For example, when the third input port IP3 is coupled to the external module EM, the switch SW couples the output terminal to the second input terminal, so as to output the second L1 band signal LB2 having a greater signal strength to the second extractor EX2, thereby enhancing GPS reception sensitivity. Conversely, when the third input port IP3 is not coupled to the external module EM, the switch SW couples the output terminal to the first input terminal so as to output the amplified first L1 band signal LB1' to the second extractor EX2.

The second extractor EX2 includes a first input terminal, a second input terminal and an output terminal, wherein the first input terminal is coupled to the second output terminal of the first extractor EX1, the second input terminal is coupled to the output terminal of the switch SW, and the output terminal is coupled to the second diplexer D2. The function of the second extractor EX2 is to merge the low band signal LB' from which the overlapping band is filtered out and the amplified first L1 band signal LB1' into a first integrated signal IS1 that is outputted from the output terminal, or to merge the low band signal LB' from which the overlapping band is filtered out and the second L1 band signal LB2 into a second integrated signal IS2 that is outputted from the output terminal.

The second diplexer D2 includes a first input terminal, a second input terminal and an output terminal, wherein the first input terminal is coupled to the second output terminal of the first diplexer D1, the second input terminal is coupled to the output terminal of the second extractor EX2, and the output terminal is coupled to the output port OP. The function of the second diplexer D2 is to merge the high band signal HB and the first integrated signal IS1 into the first output signal OS1 that is outputted from the output terminal, or to merge the high band signal HB and the second integrated signal IS2 into the second output signal OS2 that is outputted from the output terminal.

In conclusion of the above, in the signal integration circuit and the electronic device provided according to the embodiments of the present invention, multiple different input signals (including the input signal, the first L1 band signal and the second L1 band signal) are received at the same time by the signal integration circuit, and the band overlapping with the L1 band is filtered out from the input signal. These signals are then integrated into one output signal, and outputted to one input port of the communication module. Accordingly, the number of input ports required for the communication module is reduced without affecting the download speed of input signals or the reception sensitivity with respect to the L1 band.

The present invention is disclosed as the embodiments above. However, these embodiments are not to be construed as limitations to the present invention. Slight modifications and variations may be made by a person skilled in the art without departing from the spirit and scope of the present invention. Therefore, the scope of legal protection for the present invention shall be defined by the appended claims.

What is claimed is:

1. A signal integration circuit, suitable for a communication module and an external module, the signal integration circuit comprising:
a first input port, coupled to an input signal, wherein the input signal comprises a high band signal and a low band signal;
a second input port, coupled to a first L1 band signal, and selectively inputting the first L1 band signal, wherein the first L1 band signal has an overlapping band overlapping with a specific frequency in the low band signal;
a third input port, selectively coupled to the external module, wherein the external module outputs a second L1 band signal, and a band of the second L1 band signal substantially overlaps with a band of the first L1 band signal; and
an output port, coupled to the communication module, and selectively outputting a first output signal or a second output signal, wherein the first output signal comprises the high band signal, the low band signal from which the overlapping band is filtered out, and the first L1 band signal, and the second output signal comprises the high band signal, the low band signal from which the overlapping band is filtered out, and the second L1 band signal;
wherein, when the third input port is coupled to the external module, the third input port is for inputting the second L1 band signal, and the output port outputs the second output signal;
wherein, when the third input port is not coupled to the external module, the second input port is for inputting the first L1 band signal, and the output port outputs the first output signal.

2. The signal integration circuit according to claim 1, further comprising:
- a first diplexer, comprising an input terminal coupled to the first input port, a first output terminal and a second output terminal, the first diplexer for separating the input signal into the high band signal and the low band signal, wherein the low band signal is outputted from the first output terminal, and the high band signal is outputted from the second output terminal;
- a switch, comprising a first input terminal coupled to the second input port, a second input terminal coupled to the third input port and an output terminal, wherein the output terminal is selectively coupled to the first input terminal or the second input terminal to selectively output the first L1 band signal or the second L1 band signal;
- an extractor, coupled to the first diplexer and the switch, comprising a first input terminal coupled to the first output terminal of the first diplexer, a second input terminal coupled to the output terminal of the switch and an output terminal, the extractor for filtering out the overlapping band from the low band signal, merging the low band signal from which the overlapping band is filtered out and the first L1 band signal or the second L1 band signal into a first integrated signal or a second integrated signal, and outputting the first integrated signal or the second integrated signal from the output terminal, wherein the first integrated signal comprises the low band signal from which the overlapping band is filtered out and the first L1 band signal, and the second integrated signal comprises the low band signal from which the overlapping band is filtered out and the second L1 band signal; and
- a second diplexer, coupled to the first diplexer and the extractor, comprising a first input terminal coupled to the second output terminal of the first diplexer, a second input terminal coupled to the output terminal of the extractor and an output terminal coupled to the output port, the second diplexer for merging the high band signal and the first integrated signal or the second integrated signal into the first output signal or the second output signal, and outputting the first output signal or the second output signal from the output terminal.

3. The signal integration circuit according to claim 1, wherein the external module comprises a third antenna selectively coupled to the third input port, and the third antenna is for receiving the second L1 band signal; the signal integration circuit further comprising:
- a first antenna, coupled to the first input port, for receiving the input signal; and
- a second antenna, coupled to the second input port, for receiving the first L1 band signal;
- wherein a signal strength of the second L1 band signal is greater than that of the first L1 band signal.

4. A signal integration circuit, suitable for a communication module and an external module, the signal integration circuit comprising:
- a first input port, coupled to an input signal, wherein the input signal comprises a high band signal, a low band signal and a first L1 band signal, and the first L1 band signal has an overlapping band overlapping with a specific frequency in the low band signal;
- a third input port, selectively coupled to the external module, wherein the external module outputs a second L1 band signal, and a band of the second L1 band signal substantially overlaps with a band of the first L1 band signal; and
- an output port, coupled to the communication module, and selectively outputting a first output signal or a second output signal, wherein the first output signal comprises the high band signal, the low band signal from which the overlapping band is filtered out, and the first L1 band signal, and the second output signal comprises the high band signal, the low band signal from which the overlapping band is filtered out, and the second L1 band signal;
- wherein, when the third input port is coupled to the external module, the third input port is for inputting the second L1 band signal, and the output port outputs the second output signal;
- wherein, when the third input port is not coupled to the external module, the output port outputs the first output signal.

5. The signal integration circuit according to claim 4, further comprising:
- a first diplexer, comprising an input terminal coupled to the first input port, a first output terminal and a second output terminal, the first diplexer for separating the input signal into the high band signal and a non-high band signal, wherein the non-high band signal is outputted from the first output terminal, the high band signal is outputted from the second output terminal, and the non-high band signal comprises the low band signal and the first L1 band signal;
- a first extractor, coupled to the first diplexer, comprising an input terminal coupled to the first output terminal of the first diplexer, a first output terminal and a second output terminal, the first extractor for separating the low band signal and the first L1 band signal, and filtering out the overlapping band from the low band signal, wherein the first L1 band signal is outputted from the first output terminal, and the low band signal from which the overlapping band is filtered out is outputted from the second output terminal;
- a low-noise amplifier (LNA), coupled to the first extractor, comprising an input terminal coupled to the first output terminal of the first extractor and an output terminal, the LNA for amplifying the first L1 band signal and outputting the amplified first L1 band signal from the output terminal;
- a switch, comprising a first input terminal coupled to the output terminal of the LNA, a second input terminal coupled to the third input port and an output terminal, wherein the output terminal is selectively coupled to the first input terminal or the second input terminal to selectively output the amplified first L1 band signal or the second L1 band signal;
- a second extractor, coupled to the first extractor and the switch, comprising a first input terminal coupled to the second output terminal of the first extractor, a second input terminal coupled to the output terminal of the switch and an output terminal, the second extractor for merging the low band signal from which the overlapping band is filtered out and the amplified first L1 band signal or the second L1 band signal into a first integrated signal or a second integrated signal, and outputting the first integrated signal or the second integrated signal from the output terminal, wherein the first integrated signal comprises the low band signal from which the overlapping band is filtered out and the amplified first L1 band signal, and the second integrated signal comprises the low band signal from which the overlapping band is filtered out and the second L1 band signal; and a second diplexer, coupled to the first diplexer and the second extractor, comprising a first input terminal coupled to the second output terminal of the first diplexer, a second input terminal coupled to the output terminal of the second extractor and an output terminal coupled to the output port, the second diplexer for merging the high band signal and the first integrated signal or the second integrated signal into the first output signal or the second output signal, and outputting the first output signal or the second output signal from the output terminal.

6. The signal integration circuit according to claim 4, wherein the external module comprises a second antenna selectively coupled to the third input port, and the second antenna is for receiving the second L1 band signal; the signal integration circuit further comprising:

a first antenna, coupled to the first input port, for receiving the input signal;

wherein a signal strength of the second L1 band signal is greater than that of the first L1 band signal.

7. An electronic device, comprising:
a communication module;
an external module; and
a signal integration circuit, comprising:
a first input port, coupled to an input signal, wherein the input signal comprises a high band signal and a low band signal;
a second input port, coupled to a first L1 band signal, and selectively inputting the first L1 band signal, wherein the first L1 band signal has an overlapping band overlapping with a specific frequency in the low band signal;
a third input port, selectively coupled to the external module, wherein the external module outputs a second L1 band signal, and a band of the second L1 band signal substantially overlaps with a band of the first L1 band signal; and
an output port, coupled to the communication module, and selectively outputting a first output signal or a second output signal, wherein the first output signal comprises the high band signal, the low band signal from which the overlapping band is filtered out, and the first L1 band signal, and the second output signal comprises the high band signal, the low band signal from which the overlapping band is filtered out, and the second L1 band signal;
wherein, when the third input port is coupled to the external module, the third input port is for inputting the second L1 band signal, and the output port outputs the second output signal;
wherein, when the third input port is not coupled to the external module, the second input port is for inputting the first L1 band signal, and the output port outputs the first output signal.

8. The electronic device according to claim 7, wherein the signal integration circuit further comprises:

a first diplexer, comprising an input terminal coupled to the first input port, a first output terminal and a second output terminal, the first diplexer for separating the input signal into the high band signal and the low band signal, wherein the low band signal is outputted from the first output terminal, and the high band signal is outputted from the second output terminal;

a switch, comprising a first input terminal coupled to the second input port, a second input terminal coupled to the third input port and an output terminal, wherein the output terminal is selectively coupled to the first input terminal or the second input terminal to output the first L1 band signal or the second L1 band signal;

an extractor, coupled to the first diplexer and the switch, comprising a first input terminal coupled to the first output terminal of the first diplexer, a second input terminal coupled to the output terminal of the switch and an output terminal, the extractor for filtering out the overlapping band from the low band signal, merging the low band signal from which the overlapping band is filtered out and the first L1 band signal or the second L1 band signal into a first integrated signal or a second integrated signal, and outputting the first integrated signal or the second integrated signal from the output terminal, wherein the first integrated signal comprises the low band signal from which the overlapping band is filtered out and the first L1 band signal, and the second integrated signal comprises the low band signal from which the overlapping band is filtered out and the second L1 band signal; and a second diplexer, coupled to the first diplexer and the extractor, comprising a first input terminal coupled to the second output terminal of the first diplexer, a second input terminal coupled to the output terminal of the extractor and an output terminal coupled to the output port, the second diplexer for merging the high band signal and the first integrated signal or the second integrated signal into the first output signal or the second output signal, and outputting the first output signal or the second output signal from the output terminal.

9. The electronic device according to claim 7, wherein the external module comprises a third antenna selectively coupled to the third input port, the third antenna is for receiving the second L1 band signal, and the signal integration circuit further comprises:

a first antenna, coupled to the first input port, for receiving the input signal; and a second antenna, coupled to the second input port, for receiving the first L1 band signal;

wherein a signal strength of the second L1 band signal is greater than that of the first L1 band signal.

10. An electronic device, comprising:
a communication module;
an external module; and
a signal integration circuit, comprising:
a first input port, coupled to an input signal, wherein the input signal comprises a high band signal, a low band signal and a first L1 band signal, and the first L1 band signal has an overlapping band overlapping with a specific frequency in the low band signal;
a second input port, selectively coupled to the external module, wherein the external module outputs a second L1 band signal, and a band of the second L1 band signal substantially overlaps with a band of the first L1 band signal; and
an output port, coupled to the communication module, and selectively outputting a first output signal or a second output signal, wherein the first output signal comprises the high band signal, the low band signal from which the overlapping band is filtered out, and the first L1 band signal, and the second output signal comprises the high band signal, the low band signal from which the overlapping band is filtered out, and the second L1 band signal;

wherein, when the second input port is coupled to the external module, the second input port is for inputting the second L1 band signal, and the output port outputs the second output signal;

wherein, when the second input port is not coupled to the external module, the output port outputs the first output signal.

11. The electronic device according to claim 10, wherein the signal integration circuit further comprises:

a first diplexer, comprising an input terminal coupled to the first input port, a first output terminal and a second output terminal, the first diplexer for separating the input signal into the high band signal and a non-high band signal, wherein the non-high band signal is outputted from the first output terminal, the high band signal is outputted from the second output terminal, and the non-high band signal comprises the low band signal and the first L1 band signal;

a first extractor, coupled to the first diplexer, comprising an input terminal coupled to the first output terminal of the first diplexer, a first output terminal and a second output terminal, the first extractor for separating the low band signal and the first L1 band signal, and filtering out the overlapping band from the low band signal, wherein the first L1 band signal is outputted from the first output terminal, and the low band signal from which the overlapping band is filtered out is outputted from the second output terminal;

a low-noise amplifier (LNA), coupled to the first extractor, comprising an input terminal coupled to the first output terminal of the first extractor and an output terminal, the LNA for amplifying the first L1 band signal and outputting the amplified first L1 band signal from the output terminal;

a switch, comprising a first input terminal coupled to the output terminal of the LNA, a second input terminal coupled to the second input port and an output terminal, wherein the output terminal is selectively coupled to the first input terminal or the second input terminal to output the amplified first L1 band signal or the second L1 band signal;

a second extractor, coupled to the first extractor and the switch, comprising a first input terminal coupled to the second output terminal of the first extractor, a second input terminal coupled to the output terminal of the switch and an output terminal, the second extractor for merging the low band signal from which the overlapping band is filtered out and the amplified first L1 band signal or the second L1 band signal into a first integrated signal or a second integrated signal, and outputting the first integrated signal or the second integrated signal from the output terminal, wherein the first integrated signal comprises the low band signal from which the overlapping band is filtered out and the amplified first L1 band signal, and the second integrated signal comprises the low band signal from which the overlapping band is filtered out and the second L1 band signal; and a second diplexer, coupled to the first diplexer and the second extractor, comprising a first input terminal coupled to the second output terminal of the first diplexer, a second input terminal coupled to the output terminal of the second extractor and an output terminal coupled to the output port, the second diplexer for merging the high band signal and the first integrated signal or the second integrated signal into the first output signal or the second output signal, and outputting the first output signal or the second output signal from the output terminal.

12. The electronic device according to claim 10, wherein the external module comprises a second antenna selectively coupled to the second input port, the second antenna is for receiving the second L1 band signal, and the signal integration circuit further comprises:

a first antenna, coupled to the first input port, for receiving the input signal;

wherein a signal strength of the second L1 band signal is greater than that of the first L1 band signal.

* * * * *